(12) United States Patent
Rost et al.

(10) Patent No.: US 10,835,885 B2
(45) Date of Patent: Nov. 17, 2020

(54) METHOD FOR PRODUCING MICROCAPSULES

(71) Applicant: Symrise AG, Holzminden (DE)

(72) Inventors: Benjamin Rost, Bodenwerder (DE);
Ralf Bertram, Holzminden (DE);
Daniela Gregor, Holzminden (DE);
Jan Peter Ebbecke, Halle (DE);
Sabine Lange, Holzminden (DE)

(73) Assignee: Symrise AG, Holzminden (DE)

(*) Notice: Subject to any disclaimer, the term of this patent is extended or adjusted under 35 U.S.C. 154(b) by 92 days.

(21) Appl. No.: 16/097,007

(22) PCT Filed: Apr. 22, 2017

(86) PCT No.: PCT/EP2017/059581
§ 371 (c)(1),
(2) Date: Oct. 26, 2018

(87) PCT Pub. No.: WO2017/186604
PCT Pub. Date: Nov. 2, 2017

(65) Prior Publication Data
US 2019/0134592 A1    May 9, 2019

(30) Foreign Application Priority Data

Apr. 29, 2016 (EP) .................... 16167763
Nov. 8, 2016 (EP) .................... 16197703

(51) Int. Cl.
| | | |
|---|---|---|
| *B01J 13/14* | (2006.01) | |
| *B01J 13/18* | (2006.01) | |
| *C11D 3/50* | (2006.01) | |
| *B01J 13/20* | (2006.01) | |

(52) U.S. Cl.
CPC ............. *B01J 13/14* (2013.01); *B01J 13/18* (2013.01); *B01J 13/206* (2013.01); *C11D 3/505* (2013.01)

(58) Field of Classification Search
None
See application file for complete search history.

(56) References Cited

U.S. PATENT DOCUMENTS

| | | | |
|---|---|---|---|
| 2013/0061883 A1* | 3/2013 | Miravet Celades | ..... A61K 8/38 134/26 |
| 2015/0210965 A1* | 7/2015 | Bertram | ................. A01N 25/28 424/401 |

FOREIGN PATENT DOCUMENTS

| | | |
|---|---|---|
| DE | 2303866 A1 | 8/1973 |
| EP | 2204155 A1 | 7/2010 |
| EP | 2111214 B1 | 4/2011 |
| EP | 2689835 A1 | 1/2014 |
| EP | 2757146 A1 | 7/2014 |

OTHER PUBLICATIONS

Bleckmann et al., Cosmetic preparation., 2008, Derwent-Acc-No. 2008-N60632 (Year: 2008).*

* cited by examiner

*Primary Examiner* — Jeffrey D Washville
(74) *Attorney, Agent, or Firm* — Dilworth & Barrese, LLP (57) ABSTRACT

The invention relates to a method for producing microcapsules, comprising the following steps: (a) providing a first aqueous preparation containing at least one prepolymer; (b) providing a second non-aqueous preparation containing the active substance to be encapsulated; (c) mixing the aqueous and the non-aqueous phases in the presence of at least one emulsifier and/or stabilizer in order to form an emulsion; (d) polymerizing the at least one prepolymer contained in the emulsion from step (c) in order to obtain a dispersion of microcapsules that enclose the active substance; (e) hardening and cross-linking the microcapsules obtained in step (d); and optionally (f) removing the microcapsules from the dispersion and drying the microcapsules, the method being characterized in that the emulsion is formed in the presence of at least one 1,2-diol in step (c).

13 Claims, 4 Drawing Sheets

METHOD FOR PRODUCING MICROCAPSULES

FIELD OF THE INVENTION

The invention is within the field of encapsulation of actives and relates to a novel process which can help to improve the process regime in particular with regard to stability and size of the particles.

STATE OF THE ART

The term "capsule" is generally understood by the person skilled in the art to mean finely dispersed liquid or solid phases enveloped by film-forming polymers, the production of which involves precipitation of the polymers, after emulsification and coacervation or interfacial polymerization, on the material to be enveloped.

Of particular interest in this context are what are called microcapsules, which have diameters in the range from about 0.0001 to 5, preferably 0.001 to 0.5 and especially 0.005 to 0.1 mm. The first industrial production of microcapsules was in the year 1957, in which copier paper that contained the dyes in microencapsulated form was first introduced onto the market. There are now numerous types of microcapsules available, and they are used in a wide variety of different sectors. One important segment is the modification of fibers and textiles with microencapsulated actives that are applied either in a finishing operation or in the course of the washing process. When worn, the capsules break up owing to the mechanical stress and release the fragrance over a prolonged period of time.

The most important microcapsules include those of the amino resin type. These capsules are produced, in simplified terms, by first producing, under vigorous shear and in the presence of emulsifiers, an O/W emulsion which contains the water-soluble monomer, what is called an amine-formaldehyde precondensate, and the water-insoluble active, for instance a perfume oil. The polycondensation is initiated by a change in pH, for example by adjusting the pH to about 3.5 by addition of acid. The polycondensates separate out on the oil droplets in the emulsion and gradually envelop it. On conclusion of the polycondensation, the emulsion has given rise to a microcapsule dispersion. However, the capsules still have a soft, elastic shell that does not yet afford the necessary diffusion stability and texture properties. Therefore, there follows the third step in which the temperature is raised to about 60° C., which leads to crosslinking of the polymers in the wall and to hardening of the capsules. A process of this kind is known, for example, from EP 2111214 B1 (GIVAUDAN).

DE 23 03 866 A1 (FUJI) discloses a stable concentrated mixture for production of microcapsules, comprising (a) an epoxypropyltrialkylammonium salt and (b) one or more organic solvents, where these formulations additionally include an alkyl sulfosuccinate having alkyl groups having 6 to 16 carbon atoms, or an alkyl sulfosuccinamate wherein the carboxamide group is substituted by an alkyl group having 8 to 20 carbon atoms, and a water-miscible solvent as component b).

EP 2669835 A1 (KOEHLER) provides a process for producing microcapsules. The characterizing feature of these capsules is a specific particle size distribution having at least two maxima, wherein the main maximum in the particle size is in the range from 5 to 100 μm and wherein the volume occupied by the microcapsules having a particle size less than or equal to ¼ of the particle size of the main maximum is greater than or equal to about 20% of the total volume of the microcapsules. The capsule wall may consist here of a methylated melamine-formaldehyde resin and/or urea-formaldehyde resin and/or reaction products of aldehydes with thiourea, N-alkylurea, guanidine, acetoguanamine, benzoguanamine, caprionoguanamine, cyanamine, dicyandiamide and/or alkyl-/arylsulfonamide.

A first essential aspect in microencapsulation relates to the particle size distribution. The tighter this distribution can be made in the emulsion process, the more exactly it is possible to adjust the properties of the capsules. The adjustment of the capsule size has a direct effect on the fracture properties of the capsules and hence also on the sensory performance of the technology in the final application.

The second essential aspect is the stabilization of the emulsion. It is necessary here to match appropriate surfactants or protective colloids to the prepolymers used. The selection of an incorrect protective colloid can lead to faulty encapsulation.

Finally, it is desirable to be able to create the emulsion with minimum shear forces. The reason for this is obvious, since the thin skin that has just been formed can be destroyed under high shear forces and hence an elevated proportion of polymer grit occurs in the product. According to the stirrer geometry, there may additionally be high introduction of air into the system with consequent encapsulation of air bubbles.

The complex task addressed with the present set of problems was therefore to improve the prior art with regard to the production of microcapsules, specifically of amino resin microcapsules, to the effect that the average diameter of the capsules is reduced and homogenized. In other words, the aim is a very substantially monodisperse particle size distribution that has a relatively pronounced maximum at relatively small diameters. The process being sought should also allow expenditure of lower shear force owing to higher emulsion stability in order to release less disruptive polymer grit from destroyed capsules in this way.

DESCRIPTION OF THE INVENTION

The invention firstly relates to a process for producing microcapsules, specifically amino resin microcapsules, comprising the following steps:
(a) providing a first, aqueous formulation comprising at least one prepolymer;
(b) providing a second, nonaqueous formulation comprising the active to be encapsulated;
(c) mixing the aqueous phase and the nonaqueous phase in the presence of at least one emulsifier and/or stabilizer to form an emulsion;
(d) polymerizing the at least one prepolymer present in the emulsion from step (c) to obtain a dispersion of microcapsules enclosing the active;
(e) hardening and crosslinking the microcapsules obtained in step (d), and optionally
(f) removing and drying the microcapsules from the dispersion, which has the feature that the emulsion is formed in step (c) in the presence of at least one 1,2-diol.

It has been found that, surprisingly, the addition of 1,2-diols during the formation of the O/W emulsion leads to a distinct reduction in particle size, toward particle size distributions with a smaller average. At the same time, stabilization of the emulsion is achieved and hence a reduction in the stirrer speed is consequently possible.

BRIEF DESCRIPTION OF THE DRAWINGS

The present invention will be described in greater detail with reference to the accompanying drawings in which.

Figure 1:
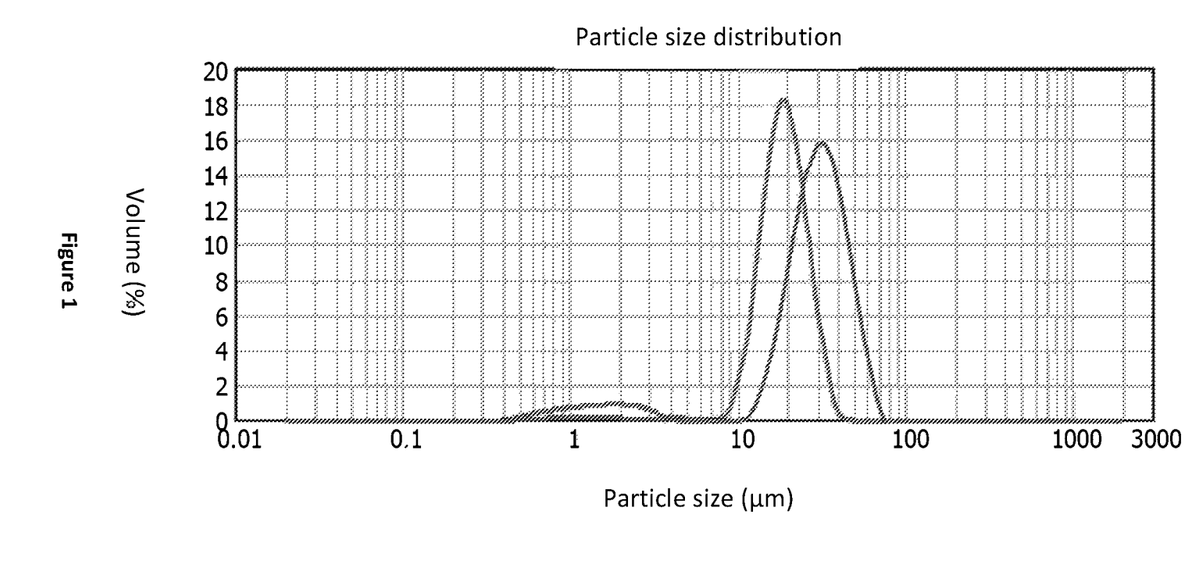
FIGS. 1 and 2 illustrate graphs comparing particle size distribution of microcapsules prepared with the addition of 1,2-diols and without the addition of 1,2-diols.
Figure 2:
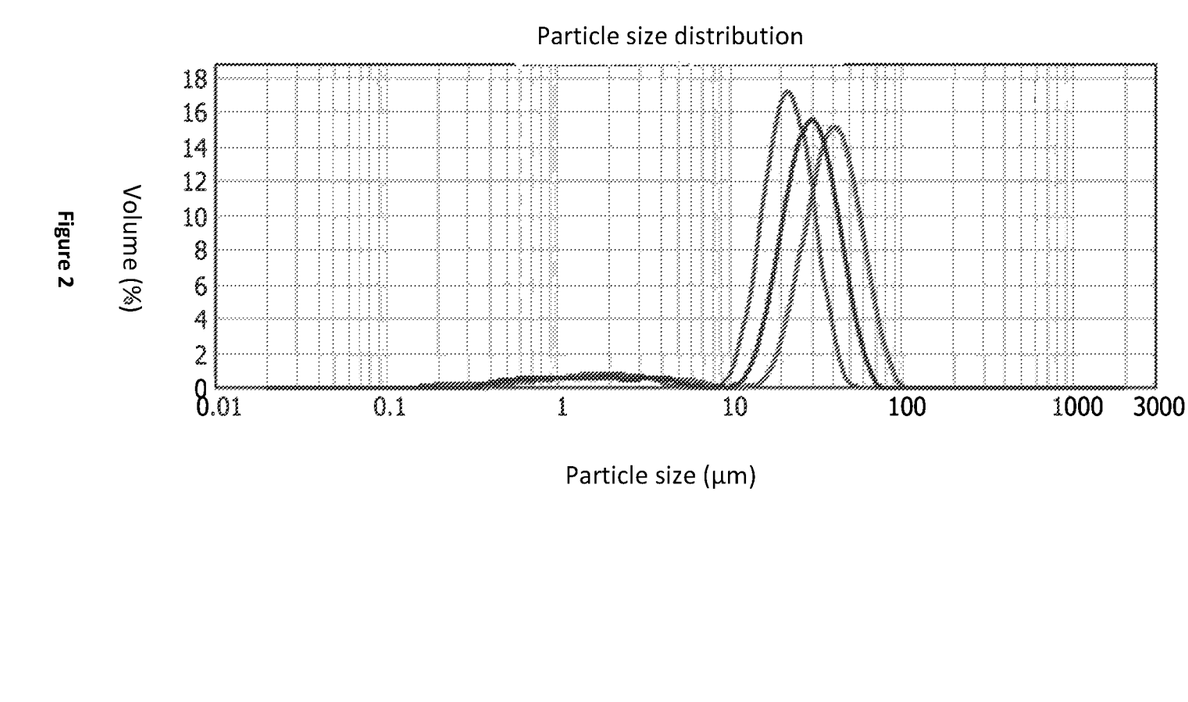

The invention is elucidated in detail by the two figures, FIGS. 1 and 2.

FIG. 1 shows a particle size distribution in the production of amino resin microcapsules, once with addition of 1% by weight of SymDiol® 68 (hexane-1,2-diol:octane-1,2-diol 1:1) (on the left) and once without addition of the diol (on the right). It can be seen that the maximum is more pronounced and has been shifted to smaller particle diameters.

A similar picture is given by FIG. 2; the left-hand curve again corresponds to the addition of 1% by weight of SymDiol® 68, the middle curve to the addition of pentane-1,2-diol (Hydrolite® 5), and the right-hand curve to no additive.

The particle size distribution in the prior art process, for example in that described in EP 2111214 B1, is 10 to 80 μm. The addition of diols can reduce this to about 10 to 35 μm. This narrower distribution enables the production of capsule systems that can be more easily optimized in terms of their sensory performance. There are additionally advantages in the stabilization of the capsule systems in the final application. According to Strok's law, the size of the capsules is one of the factors that affects the separation rate. A more homogeneous distribution enables, for example, more exact tailoring of the density of the perfume oils in a detergent base. Thus, the distribution of the capsules on application is more homogeneous and enables more stable formulations. The speed of the stirrers in this case can be reduced by 200 to 260 rpm, which corresponds to an average reduction by about 15%.

The capsule diameter additionally also has an effect on density according to the following formula:

$$V(p) = \frac{2r2g(\rho k - \rho f)}{9\eta}$$

where V(p) represents the sedimentation rate, g a gravity factor, ρk the capsule density, ρf the liquid density and η the viscosity of the liquid.

Figure 3:
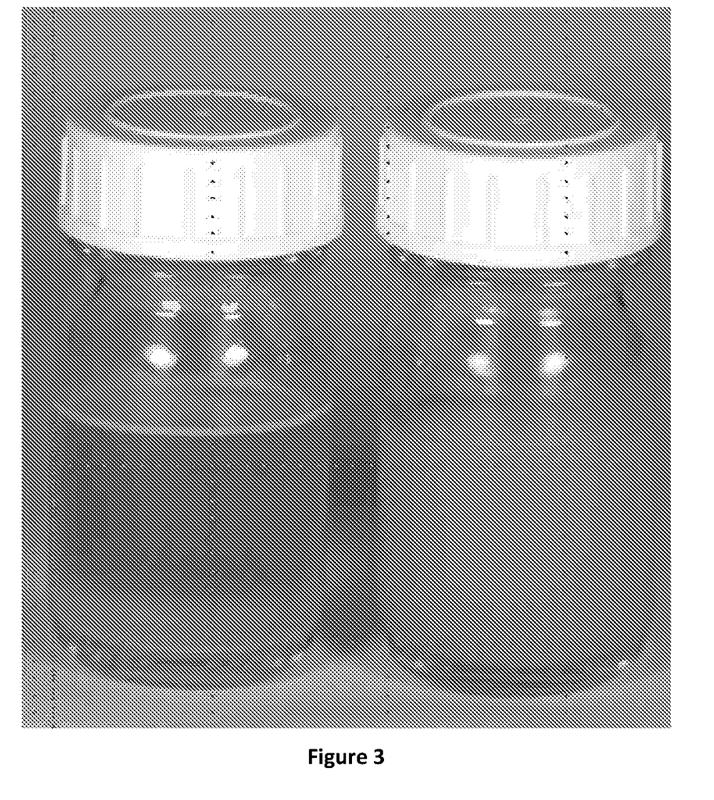
FIG. 3 is a photograph comparing microcapsule dispersions prepared according to the present invention and those prepared by the standard method.

FIG. 3 shows two microcapsule dispersions: the left-hand dispersion was produced by the standard method and has an average particle diameter of about 50 μm; the right-hand dispersion was produced with addition of 1,2-diols and has an average particle diameter of about 22 μm. As can be seen, the microcapsules in the sample of the invention are homogeneously dispersed, whereas they have fallen to the bottom in the comparative sample.

In addition, the separation of polymer in what are called the phase separation processes in the encapsulation is one of the crucial points for producing a stable encapsulation. In the process, deposition problems are frequently caused specifically in the event of a change in concentration of precondensates. These deposition problems are manifested in a rise in viscosity. It can even lead to precipitation of polymer and complete polymerization of the batch. Precipitation of condensate ensures an elevated fines fraction in the slurry. This is extremely disadvantageous for the following reasons:

the fines fraction leads to elevated turbidity, for example in the detergent of fabric softener base, which is regarded as a deterioration in quality by the user, precipitated polymer is not available to bring the capsule shell to the required strength, and the fines fraction can lead to sediment on application and additionally ensures an adverse visual effect in the end product.

The addition of the diols leads to optimized and controlled separation of polymer, as a result of which the shell thickness can be reduced. More particularly, the risk that the precondensate is not separated out completely on the shell is minimized.

In the field of microencapsulation, the microbiological stabilization of the products is likewise a very important factor. According to the chemical system used, sufficient formaldehyde is present to protect the dispersions from microbial infestation. However, the market and legislation are demanding that the formaldehyde concentration be lowered, and the reduction in the shell thicknesses additionally reduces the proportion of formaldehyde-containing precondensates. The effect of this is that the products are insufficiently stabilized to prevent microbial contamination. This is a further advantage of the additional use of diols: since they are antimicrobially active, products that are sufficiently stabilized are obtained without the need for addition of further preservatives.

Prepolymers

Preferred prepolymers in the context of the invention are what are called the amine-formaldehyde precondensates (AFP). In a preferred embodiment, these form the material which, as a result of polycondensation, ultimately forms the wall or shell of the capsules and encloses the active.

The amine component of the AFP is typically urea or especially melamine. However, since the polycondensation is thermally controlled, control thereof is sometimes difficult. The preferred AFPs are therefore alkylation products of melamine with short chain alcohols, and especially the so-called highly or partly alkoxylated and possibly even also alkylated melamines as supplied in aqueous-methanolic formaldehyde solution under the Luracoll® name, especially Luracoll® SD, by BASF.

The amine component of the AFP is typically urea or especially melamine. However, since the polycondensation is thermally controlled, control thereof is sometimes difficult. The preferred AFPs are therefore alkylation products of melamine with short chain alcohols, and especially the so-called highly or partly alkoxylated and possibly even also alkylated melamines as supplied in aqueous-methanolic formaldehyde solution under the Luracoll® name, especially Luracoll® SD, by BASF.

The reaction between melamine and formaldehyde was discovered by J. Liebig, for example, as early as 1834 and has been utilized industrially since 1936. It can be described by the following scheme:

Useful prepolymers preferably include: optionally alkylated mono- and polymethylolurea and mono- and polymethylolmelamine precondensates as sold, for example, under the URAC name (Cytec Corp.) or else partially methylated mono- and polymethylol-1,3,5-triamino-2,4,6-triazine precondensates commercially available under the CYMEL name (Cytec Corp.). Also useful, finally, are mono- and polyalkylolbenzoguanamine or mono- and polyalkylolglycoluril precondensates. If these precondensates have alkyl groups, they are less reactive and storable for longer periods. The preferred precondensates include the polymethylolmelamines and polymethylol-1-(3,5-dihydroxymethylbenzyl)-3,5-triamino-2,4,6-triazine.

It is likewise possible to use poly[N-(2,2-dimethoxy-1-hydroxy)]polyamines, for example di[N-(2,2-dimethoxy-1-hydroxy)]urea, tri[N-(2,2-dimethoxy-1-hydroxy)]melamine, tetra[N-(2,2-dimethoxy-1-hydroxy)]glycoluril and di-[N-(2,2-dimethoxy-1-hydroxy)]-benzoguanidine and mixtures thereof.

Additionally preferred prepolymers are dialdehydes and resorcinol.

Actives

The nature of the actives that are to be encapsulated is largely uncritical, provided that they are sufficiently water-insoluble, since there is otherwise no formation of emulsions on which droplet surface the polycondensates can be deposited. Useful actives are preferably aromas, fragrances or else biogenic principles, for instance:

Aromas

Typical examples of aromas that can be encapsulated in the context of the invention include: acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineole, cinnamyl acetate, citral, citronellol, citronellal, citronellyl acetate, cyclohexyl acetate, cymene, damascone, decalactone, dihydrocoumarin, dimethyl anthranilate, dimethyl anthranilate, dodecalactone, ethoxyethyl acetate, ethylbutyric acid, ethyl butyrate, ethyl caprate, ethyl caproate, ethyl crotonate, ethyl furaneol, ethyl guaiacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzylacetone, isoamyl alcohol, isoamyl isovalerate, isobutyl butyrate, isobutyraldehyde, isoeugenol methyl ether, isopropylmethylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methylmethyl butyrate, 2-methyl-2-pentenolic acid, methyl thiobutyrate, 3,1-methylthiohexanol, 3-methylthiohexyl acetate, nerol, neryl acetate, trans,trans-2,4-nonadienal, 2,4-nonadienol, 2,6-nonadienol, 2,4-nonadienol, nootkatone, delta octalactone, gamma octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethyl isovalerate, piperonal, propionaldehyde, propyl butyrate, pulegone, pulegol, sinensal, sulfurol, terpinene, terpineol, terpinols, 8,3-thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3(2H)-furanone and derivatives thereof (here preferably homofuraneol) (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyl deltadecalactone, massoia lactone, deltadecalactone, tuberolactone), methyl sorbate, divanillin, 4-hydroxy-2(or 5)-ethyl-5(or 2)-methyl-3(2H)-furanone, 2-hydroxy-3-methyl-2-cyclopentenone, 3-hydroxy-4,5-dimethyl-2(5H)-furanone, acetic acid isoamyl ester, butyric acid ethyl ester, butyric acid n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl 3-methyl-3-phenyl-glycidate, ethyl 2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl) disulfide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and (not explicitly stated here) stereoisomers, enantiomers, positional isomers, diastereomers, cis/trans isomers or epimers of these substances.

Fragrances

Extracts from natural raw materials, such as essential oils, concretes, absolutes, resins, resinoids, balsams, tinctures for example ambra tincture; amyris oil; angelica seed oil; angelica root oil; anis oil; valerian oil; basil oil; tree moss absolute; bay oil; mugwort oil; benzoin resin; bergamot oil; beeswax absolute; birch tar oil; bitter almond oil; savory oil; bucco leaf oil; cabreuva oil; cade oil; calmus oil; camphor oil; cananga oil; cardamom oil; cascarilla oil; cassia oil; cassie absolute; castoreum absolute; cedar leaf oil; cedar wood oil; cistus oil; citronella oil; lemon oil; copaiba balsam; copaiba balsam oil; coriander oil; costus root oil; cumin oil; cypress oil; davana oil; dill oil; dill seed oil; eau de brouts absolute; oakmoss absolute; elemi oil; estragon oil; eucalyptus citriodora oil; eucalyptus oil; fennel oil; pine needle oil; galbanum oil; galbanum resin; geranium oil; grapefruit oil; guaiac wood oil; gurjun balsam; gurjun balsam oil, helichrysum absolute; helichrysum oil; ginger oil; iris root absolute; iris root oil; jasmine absolute; calamus oil; camellia oil blue; camellia oil roman; carrot seed oil; cascarilla oil; pine needle oil; spearmint oil; cumin oil; labdanum oil; labdanum absolute; labdanum resin; lavandin absolute; lavandin oil; lavender absolute; lavender oil; lemon grass oil; lovage oil; lime oil distilled; lime oil pressed; linalool oil; litsea cubeba oil; laurel leaf oil; macis oil; marjoram oil; mandarin oil; massoia bark oil; mimosa absolute; musk seed oil; musk tincture; clary sage oil; nutmeg oil; myrrh absolute; myrrh oil; myrtle oil; clove leaf oil; clove flower oil; neroli oil; olibanum absolute; olibanum oil; opopanax oil; orange blossom absolute; orange oil; oregano oil; palmarosa oil; patchouli oil; perilla oil; Peruvian balsam oil; parsley leaf oil; parsley seed oil; petitgrain oil; peppermint oil; pepper oil; allspice oil; pine oil; poley oil; rose absolute; rosewood oil; rose oil; rosemary oil; sage oil dalmatian; sage oil Spanish; sandalwood oil; celery seed oil; spike lavender oil; star anis oil; styrax oil; tagetes oil; fir needle oil; tea tree oil; turpentine oil; thyme oil; tolu balsam; tonka absolute; tuberose absolute; vanilla extract; violet leaf absolute; verbena oil; vetiver oil; juniper berry oil; wine yeast oil; vermouth oil; wintergreen oil; ylang oil; ysop oil; civet absolute; cinnamon leaf oil; cinnamon bark oil; and fractions thereof or ingredients isolated therefrom;

hydrocarbons, for example 3-carene; a-pinene; beta-pinene; alpha-terpinene; gamma-terpinene; p-cymol; bisabolene; camphene; caryophyllene; cedrene; farnesene; limonene; longifolene; myrcene; ocimene; valencene; (E,Z)-1,3,5-undecatriene;

aliphatic alcohols, for example hexanol; octanol; 3-octanol; 2,6-dimethylheptanol; 2-methylheptanol, 2-methyloctanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol;

aliphatic aldehydes and acetals thereof, for example hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanal diethyl acetal; 1,1-dimethoxy-2,2,5-trimethyl-4-hexene; citronellyloxyacetaldehyde;

aliphatic ketones and oximes thereof, for example 2-heptanone; 2-octanone; 3-octanone; 2-nonanone; 5-methyl-3-heptanone; 5-methyl-3-heptanonoxime; 2,4,4,7-tetramethyl-6-octen-3-one;

aliphatic sulfur-containing compounds, for example 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;

aliphatic nitriles, for example 2-nonenonitrile; 2-tridecenonitrile; 2,12-tri-decenonitrile; 3,7-dimethyl-2,6-octadienonitrile; 3,7-dimethyl-6-octenonitrile;

aliphatic carboxylic acids and esters thereof, for example (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl-2-methyl pentanoate; ethyl hexanoate; allyl hexanoate; ethyl heptanoate; allyl heptanoate; ethyl octanoate; ethyl (E,Z)-2,4-decadienoate; methyl 2-octynoate; methyl 2-nonynoate; allyl 2-isoamyl oxyacetate; methyl 3,7-dimethyl-2,6-octadienoate;

acyclic terpene alcohols, for example citronellol; geraniol; nerol; linalool; lavadulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; and formates, acetates, propionates, isobutyrates, butyrates, isovalerates, pentanoates, hexanoates, crotonates, tiglinates, and 3-methyl-2-butenoates thereof;

acyclic terpene aldehydes and ketones, for example geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl and diethyl acetals of geranial, neral, and 7-hydroxy-3,7-dimethyloctanal;

cyclic terpene alcohols, for example menthol; isopulegol; a-terpineol; terpinenol-4; menthan-8-ol; menthan-1-ol; menthan-7-ol; borneol; isoborneol; linalool oxide; nopol; cedrol; ambrinol; vetiverol; guaiol; and their formates, acetates, propionates, isobutyrates, butyrates, isovalerates, pentanoates, hexanoates, crotonates, tiglinates, and 3-methyl-2-butenoates;

cyclic terpene aldehydes and ketones, for example menthone; isomenthone; 8-mercaptomenthan-3-one; carvone; camphor; fenchone; a-ionone; beta-ionone; a-n-methyl ionone; beta-n-methylionone; a-isomethylionone; beta-isomethylionone; a-irone; a-damascone; beta-damascone; beta-damascenone; ?-damascone; d-damascone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; nootkatone; dihydronootkatone; a-sinensal; beta-sinensal; acetylated cedar wood oil (methyl cedryl ketone);

cyclic alcohols, for example 4-tert-butylcyclohexanol; 3,3,5-trimethylcyclohexanol; 3-isocamphylcyclohexanol; 2,6,9-trimethyl-(Z2,Z5,E9)-cyclododecatrien-1-ol; 2-isobutyl-4-methyltetrahydro-2H-pyran-4-ol; from the group of the cycloaliphatic alcohols for example a,3,3-trimethyl-cyclohexyl methanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

cyclic and cycloaliphatic ethers, for example cineol; cedryl methyl ether; cyclododecyl methyl ether; (ethoxymethoxy)cyclododecane; a-cedrene epoxide; 3a,6,6,9a-tetramethyldodecahydronaphtho[2,1-b]furan; 3a-ethyl-6,6,9a-trimethyldodecahydronaph-tho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

cyclic ketones, for example 4-tert-butylcyclohexa none; 2,2,5-tri methyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert-pentylcyclohexanone; 5-cyclohexadecen-1-one; 6,7-dihydro-1,1,2,3,3-pentamethyl-4(5H)-indanone; 9-cycloheptadecen-1-one; cyclopentadecanone; cyclohexadecanone;

cycloaliphatic aldehydes, for example 2,4-dimethyl-3-cyclohexenecarbaldehyde; 2-methyl-4-(2,2,6-tri methylcyclohexen-1-yl)-2-butenal; 4-(4-hydroxy-4-methylpentyl)-3-cyclohexenecarbaldehyde; 4-(4-methyl-3-penten-1-yl)-3-cyclohexenecarbaldehyde;

cycloaliphatic ketones, for example 1-(3,3-dimethylcyclohexyl)-4-penten-1-one; 1-(5,5-dimethyl-1-cyclohexen-1-yl)-4-penten-1-one; 2,3,8,8-tetra methyl-1,2,3,4,5,6,7,8-octa-hydro-2-naphthalenyl methyl ketone; methyl 2,6,10-trimethyl-2,5,9-cyclododecatrienyl ketone; tert-butyl 2,4-dimethyl-3-cyclohexen-1-yl ketone;

esters of cyclic alcohols, for example 2-tert-butylcyclohexyl acetate; 4-tert-butylcyclo-hexylacetate; 2-tert-pentylcyclohexyl acetate; 4-tert-pentylcyclohexyl acetate; decahydro-2-naphthylacetate; 3-pentyltetrahydro-2H-pyran-4-yl acetate; decahydro-2,5,5,8a-tetramethyl-2-naphthyl acetate; 4,7-methano-3a,4,5,6,7,7a-hexahydro-5- or -6-indenyl acetate; 4,7-methano-3a,4,5,6,7,7a-hexahydro-5- or -6-indenyl propionate; 4,7-methano-3a,4,5,6,7,7a-hexahydro-5- or -6-indenyl isobutyrate; 4,7-methanooctahydro-5- or -6-indenyl acetate;

esters of cycloaliphatic carboxylic acids, for example allyl 3-cyclohexyl propionate; allyl cyclohexyloxyacetate; methyl dihydrojasmonate; methyl jasmonate; methyl 2-hexyl-3-oxocyclopentanecarboxylate; ethyl 2-ethyl-6,6- dimethyl-2-cyclohexenecarboxylate; ethyl 2,3,6,6-tetramethyl-2-cyclohexenecarboxylate; ethyl 2-methyl-1,3-dioxolane-2-acetate;

aromatic hydrocarbons, for example styrene and diphenylmethane;

araliphatic alcohols, for example benzyl alcohol; 1-phenethyl alcohol; 2-phenethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

esters of araliphatic alcohols and aliphatic carboxylic acids, for example benzyl acetate; benzyl propionate; benzyl isobutyrate; benzyl isovalerate; 2-phenethyl acetate; 2-phenethyl propionate; 2-phenethyl isobutyrate; 2-phenethyl isovalerate; 1-phenethyl acetate; a-trichloromethylbenzyl acetate; a,a-dimethylphenethyl acetate; a,a-dimethylphenethyl butyrate; cinnamyl acetate; 2-phenoxyethyl isobutyrate; 4-methoxybenzyl acetate;

araliphatic ethers, for example 2-phenethyl methyl ether; 2-phenethyl isoamyl ether; 2-phenethyl 1-ethoxyethyl ether; phenylacetaldehyde dimethyl acetal; phenylacetaldehyde diethyl acetal; hydratropic aldehyde dimethyl acetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin;

aromatic and araliphatic aldehydes, for example benzaldehyde; phenylacetaldehyde; 3-phenylpropanal; hydratropic aldehyde; 4-methylbenzaldehyde; 4-methylphenyl-acetaldehyde; 3-(4-ethylphenyl)-2,2-dimethylpropanal; 2-methyl-3-(4-isopropylphenyl)-propanal; 2-methyl-3-(4-tert-butylphenyl)propanal; 3-(4-tert-butylphenyl)propanal; cinnamaldehyde; a-butylcinnamaldehyde; a-amylcinnamaldehyde; a-hexylcinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

aromatic and araliphatic ketones, for example acetophenone; 4-methylacetophenone; 4-methoxyacetophenone; 4-tert-butyl-2,6-dimethylacetophenone; 4-phenyl-2-butanone; 4-(4-hydroxyphenyl)-2-butanone; 1-(2-naphthalenyl)ethanone; benzophenone; 1,1,2,3,3,6-hexamethyl-5-indanyl methyl ketone; 6-tert-butyl-1,1-dimethyl-4-indanyl methyl ketone; 1-[2,3-dihydro-1,1,2,6-tetramethyl-3-(1-methylethyl)-1H-5-indenyl]ethanone; 5',6',7',8'-tetrahydro-3',5',5',6',8',8'-hexamethyl-2-acetonaphthone;

aromatic and araliphatic carboxylic acids and esters thereof, for example benzoic acid; phenylacetic acid; methyl benzoate; ethyl benzoate; hexyl benzoate; benzyl benzoate; methylphenyl acetate; ethylphenyl acetate; geranyl phenyl acetate; phenethyl phenylacetate; methyl cinnamate; ethyl cinnamate; benzyl cinnamate; phenylethyl cinnamate; cinnamyl cinnamate; allyl phenoxyacetate; methyl salicylate; isoamyl salicylate; hexyl salicylate; cyclohexyl salicylate; cis-3-hexenyl salicylate; benzyl salicylate; phenylethyl salicylate; methyl 2,4-dihydroxy-3,6-dimethylbenzoate; ethyl 3-phenylglycidate; ethyl 3-methyl-3-phenylglycidate;

nitrogen-containing aromatic compounds, for example 2,4,6-trinitro-1,3-dimethyl-5-tert-butylbenzene; 3,5-dinitro-2,6-dimethyl-4-tert-butylacetophenone; cinnamonitrile; 5-phenyl-3-methyl-2-pentenonitrile; 5-phenyl-3-methylpentanonitrile; methyl anthranilate; methyl N-methylanthranilate; Schiff bases of methyl anthranilate with 7-hydroxy-3,7-dimethyloctanal, 2-methyl-3-(4-tert-butylphenyl)propanal or 2,4-dimethyl-3-cyclohexenecarbaldehyde; 6-isopropylquinoline; 6-isobutylquinoline; 6-sec-butylquinoline; indole; skatole; 2-methoxy-3-isopropylpyrazine; 2-isobutyl-3-methoxypyrazine; 4-(4,8-dimethyl-3,7-nonadienyl)pyridine;

phenols, phenyl ethers and phenyl esters, for example estragole; anethole; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresylphenyl acetate; from the group of the heterocyclic compounds, for example 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

lactones, for example 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene-1,12-dodecandioate; ethylene-1,13-tridecandioate; coumarin; 2,3-dihydrocoumarin; octahydrocoumarin.

Biogenic Principles

Biogenic principles are understood to mean actives having biological activity, for example tocopherol, tocopherol acetate, tocopherol palmitate, ascorbic acid, carnitine, carnosine, caffeine, (deoxy)ribonucleic acid and fragmentation products thereof, β-glucans, retinol, bisabolol, allantoin, phytantriol, panthenol, AHA acids, amino acids, ceramides, pseudoceramides, essential oils, plant extracts, and vitamin complexes.

Diols

The 1,2-diols that can additionally be used according to the invention in the emulsion formation stabilize the emulsion and in so doing promote the formation of comparatively smaller droplets and hence also of corresponding microcapsules, and are similar in their behavior to protective colloids.

The 1,2-diols may be pentane-1,2-diol, hexane-1,2-diol, octane-1,2-diol, decane-1,2-diol, dodecane-1,2-diol, and any desired mixtures of two, three or more of these substances. Preference is given to using a mixture of hexane-1,2-diol and octane-1,2-diol (SymDeo® 68, Symrise AG); alternatively, one or both components may be completely or partly replaced by pentane-1,2-diol (Hydrolite® 5).

Preferably, the diols are added to the emulsions in an amount of about 1% to about 10% by weight, preferably about 2% to about 5% by weight-based in each case on the emulsion.

Emulsifiers

In the context of the process according to the invention, emulsifiers, preferably W/O emulsifiers, are required, which enable homogeneous distribution of the oil droplets in the aqueous phase.

Examples of useful emulsifiers include nonionogenic surfactants from at least one of the following groups:

addition products of 2 to 30 mol of ethylene oxide and/or 0 to 5 mol of propylene oxide onto linear fatty alcohols having 8 to 22 carbon atoms, fatty acids having 12 to 22 carbon atoms, alkylphenols having 8 to 15 carbon atoms in the alkyl group and alkylamines having 8 to 22 carbon atoms in the alkyl radical;

alkyl and/or alkenyl oligoglycosides having 8 to 22 carbon atoms in the alk(en)yl radical and ethoxylated analogs thereof;

addition products of 1 to 15 mol of ethylene oxide onto castor oil and/or hardened castor oil;

addition products of 15 to 60 mol of ethylene oxide onto castor oil and/or hardened castor oil;

partial esters of glycerol and/or sorbitan with unsaturated, linear or saturated, branched fatty acids having 12 to 22 carbon atoms and/or hydroxycarboxylic acids having 3 to 18 carbon atoms and adducts thereof with 1 to 30 mol of ethylene oxide;

partial esters of polyglycerol (average degree of autocondensation 2 to 8), polyethylene glycol (molecular weight 400 to 5000), trimethylolpropane, pentaerythritol, sugar alcohols (e.g. sorbitol), alkyl glucosides (e.g. methyl glucoside, butyl glucoside, lauryl glucoside) and polyglucosides (e.g. cellulose) with saturated and/or unsaturated, linear or branched fatty acids having 12 to 22 carbon atoms and/or hydroxycarboxylic acids having 3 to 18 carbon atoms and adducts thereof with 1 to 30 mol of ethylene oxide;

mixed esters of pentaerythritol, fatty acids, citric acid and fatty alcohol and/or mixed esters of fatty acids having 6 to 22 carbon atoms, methylglucose and polyols, preferably glycerol or polyglycerol.

mono, di- and trialkyl phosphates and mono, di- and/or tri-PEG alkyl phosphates and salts thereof;

lanolin alcohols;

polysiloxane-polyalkyl-polyether copolymers or corresponding derivatives; block copolymers, e.g. PEG-30 dipolyhydroxy stearate;

polymer emulsifiers, for example Pemulen products (TR-1,TR-2) from Goodrich or Cosmedia® SP from Cognis;

polyalkylene glycols and glycerol carbonate.

Particularly suitable emulsifiers are more particularly elucidated hereinafter:

Alkoxylates. The addition products of ethylene oxide and/or propylene oxide onto fatty alcohols, fatty acids, alkylphenols or castor oil are known, commercially available products. These are homolog mixtures having an average degree of alkoxylation corresponding to the ratio of the molar amounts of ethylene oxide and/or propylene oxide to the substrate with which the addition reaction is carried out. $C_{12/18}$ fatty acid mono- and diesters of addition products of ethylene oxide to glycerol are known as refatting agents for cosmetic preparations.

Alkyl and/or alkenyl oligoglycosides. Alkyl and/or alkenyl oligoglycosides and the preparation and use thereof are known from the prior art. In particular, they are prepared by reacting glucose or oligosaccharides with primary alcohols having 8 to 18 carbon atoms. With regard to the glycoside radical, both monoglycosides in which a cyclic sugar residue is glycosidically bonded to the fatty alcohol and oligomeric glycosides with a degree of oligomerization of preferably up to about 8 are suitable. The degree of oligomerization is a statistical average that forms the basis for a homologous distribution that is typical of such industrial products.

Partial glycerides. Typical examples of suitable partial glycerides are hydroxystearic acid monoglyceride, hydroxystearic acid diglyceride, isostearic acid monoglyceride, isostearic acid diglyceride, oleic acid monoglyceride, oleic acid diglyceride, ricinoleic acid monoglyceride, ricinoleic acid diglyceride, linoleic acid monoglyceride, linoleic acid diglyceride, linolenic acid monoglyceride, linolenic acid diglyceride, erucic acid monoglyceride, erucic acid diglyceride, tartaric acid monoglyceride, tartaric acid diglyceride, citric acid monoglyceride, citric acid diglyceride, malic acid monoglyceride, malic acid diglyceride and technical mixtures thereof, which may also contain minor amounts of triglyceride from the production process. Likewise suitable are addition products of 1 to 30, preferably 5 to 10, mol of ethylene oxide onto the partial glycerides mentioned.

Sorbitan esters. Suitable sorbitan esters include sorbitan monoisostearate, sorbitan sesquiisostearate, sorbitan diisostearate, sorbitan triisostearate, sorbitan monooleate, sorbitan sesquioleate, sorbitan dioleate, sorbitan trioleate, sorbitan monoerucate, sorbitan sesquierucate, sorbitan dierucate, sorbitan trierucate, sorbitan monoricinoleate, sorbitan sesquiricinoleate, sorbitan diricinoleate, sorbitan triricinoleate, sorbitan nnonohydroxystearate, sorbitan sesquihydroxystearate, sorbitan dihydroxystea rate, sorbitan trihydroxystearate, sorbitan monotartrate, sorbitan sesquitartrate, sorbitan ditartrate, sorbitan tritartrate, sorbitan monocitrate, sorbitan sesquicitrate, sorbitan dicitrate, sorbitan tricitrate, sorbitan monomaleate, sorbitan sesquimaleate, sorbitan dimaleate, sorbitan tri-maleate and industrial mixtures thereof. Likewise suitable are addition products of 1 to 30, preferably 5 to 10, mol of ethylene oxide onto the above-mentioned sorbitan esters.

Polyglycerol esters. Typical examples of suitable polyglycerol esters are Polyglyceryl-2 Dipolyhydroxystea rate (Dehymuls® PGPH), Polyglycerol-3 Diisostearate (Lameform® TGI), Polyglyceryl-4 Isostearate (Isolan® GI 34), Polyglyceryl-3 Oleate, Diisostearoyl Polyglyceryl-3 Diisostearate (Isolan® PDI), Polyglyceryl-3 Methylglucose Distearate (Tego Care® 450), Polyglyceryl-3 Beeswax (Cera)Bellina®, Polyglyceryl-4 Caprate (Polyglycerol Caprate T 20 10/90), Polyglyceryl-3 Cetyl Ether (Chimexane® NL), Polyglyceryl-3 Distearate (Cremophor® GS 32) and Polyglyceryl Polyricinoleate (Admul® WOL 1403), Polyglyceryl Dimerate Isostearate, and mixtures thereof. Examples of further suitable polyol esters are mono, di- and triesters of trimethylolpropane or pentaerythritol, optionally reacted with 1 to 30 mol of ethylene oxide, with lauric acid, coconut fatty acid, tallow fatty acid, palmitic acid, stearic acid, oleic acid, behenic acid and the like.

Anionic emulsifiers. Typical anionic emulsifiers are aliphatic fatty acids having 12 to 22 carbon atoms, for example palmitic acid, stearic acid or behenic acid, and dicarboxylic acids having 12 to 22 carbon atoms, for example azelaic acid or sebacic acid.

Amphoteric and cationic emulsifiers. In addition, zwitterionic surfactants may be used as emulsifiers. Zwitterionic surfactants refer to those surfactant compounds having at least one quaternary ammonium group and at least one carboxylate and one sulfonate group in the molecule. Particularly suitable zwitterionic surfactants are the so-called betaines, such as the N-alkyl-N,N-dimethyl ammonium glycinates, e.g. cocoalkyldimethylammonium glycinate, the N-acylaminopropyl-N,N-dimethylammonium glycinates, for example cocoacylaminopropyl-dimethylammonium glycinate, 2-alkyl-3-carboxylmethyl-3-hydroxyethylimidazolines having 8 to 18 carbon atoms respectively in the alkyl or acyl group, and cocoacylaminoethyl-hydroxyethyl carboxymethyl glycinate. Particular preference is given to the fatty acid amide derivative known by the CTFA name Cocamidopropyl Betaine. Likewise suitable emulsifiers are ampholytic surfactants. Ampholytic surfactants are understood to mean surfactant compounds which, in addition to one $C_{8/18}$ alkyl or acyl group in the molecule, contain at least one free amino group and at least one —COOH— or —SO$_3$H group and are capable of forming internal salts. Examples of suitable ampholytic surfactants are N-alkylglycines, N-alkylpropionic acids, N-alkylaminobutyric acids, N-alkyliminodipropionic acids, N-hydroxyethyl-N-alkylamidopropylglycines, N-alkyltaurines, N-alkylsarcosines, 2-alkylamino-propionic acids and alkylaminoacetic acids each having about 8 to 18 carbon atoms in the alkyl group. Particularly preferred ampholytic surfactants are N-cocoalkylaminopropionate, cocoacylaminoethylaminopropionate and $C_{12/18}$ acylsarcosine. Finally, cationic surfactants are also suitable as emulsifiers, particular preference being given to those of the ester quat type, preferably methylquaternized di-fatty acid triethanolamine ester salts.

The emulsifiers may be added in amounts of about 0.5% to about 10% by weight and preferably about 1% to about 5% by weight-based in each case on the emulsion.

Stabilizers and Protective Colloids

Preferably, the emulsions additionally contain stabilizers or protective colloids. Suitable examples include, in particular, acrylic copolymers that have sulfonate groups, for example LUPASOL® PA140 or LUPASOL® VFR (BASF). Likewise suitable are copolymers of acrylamides and acrylic acid, copolymers of alkyl acrylates and N-vinylpyrrolidone, for example LUVISKOL® K15, K30 or K90 (BASF); sodium polycarboxylates, sodium polystyrenesulfonates, vinyl ether- and methyl vinyl ether-maleic anhydride copolymers, and ethylene-, isobutylene- or styrene-maleic anhydride copolymers.

The preferred stabilizers are the abovementioned representatives from the LUPASOL® series, especially in combination with AFP of the LURACOLL® type.

The use amount of the stabilizers may be in the range from about 1% to about 10% by weight and especially about 2% to about 5% by weight-based on the emulsion.

Process Procedure

A characteristic feature of the process according to the invention is that the whole reaction sequence is conducted with vigorous stirring.

In the context of the process according to the invention, an aqueous emulsion is first prepared, containing the amine-formaldehyde precondensate, the active and the diol component, and optionally emulsifiers and/or stabilizers. These components are mixed vigorously, where the proportion of water in the mixture is about 50% to 60% by weight and the loading with the active, i.e., for example, the perfume oil, is 30% to 40% by weight. Diols, emulsifiers and stabilizers are used in the amounts specified above. The emulsion is formed hitherto at room temperature or slightly elevated temperature (maximum 35° C.) and under vigorous shear.

The polycondensation is triggered by a change in pH. For this purpose, an acid, for example formic acid or acetic acid, is added to the solution and a pH of about 1.0 to 4.0, preferably of about 3.0 to 3.5, is established. At the same time, the stirrer power is reduced, for example to about 600 to 900 rpm, in order not to break up the capsules again as they form. The polycondensates are deposited on the finely divided oil droplets and begin to enclose them. At the end, the emulsion has been converted to a microcapsule dispersion.

After the end of the polycondensation, the still-soft capsules have to harden in the dispersion by crosslinking of the constituents of the capsule shell. This is triggered by a change in temperature, by raising it stepwise to 50 to 70° C. It is additionally advisable to add further melamine to the solution, which can be incorporated into the shell and reinforces it.

The dispersion may contain eliminated and unreacted formaldehyde, which is unacceptable for further use when there is contact with the human skin. Finally, a small amount of a formaldehyde scavenger, for example an amine and especially urea, is added to the dispersion.

The aqueous dispersion can be dried; it is customary, however, to adjust it to an alkaline pH and admix it with a thickener that promotes homogeneous distribution of the capsules in the dispersion and counteracts sedimentation.

INDUSTRIAL APPLICABILITY

The invention further relates to the use of 1,2-diols selected from the group formed by pentane-1,2-diol, hexane-1,2-diol, octane-1,2-diol, decane-1,2-diol, dodecane-1,2-diol and any mixtures of two, three or more of these substances as additives in the production of microcapsules and specifically to the use as additives for regulation of particle size in the production of microcapsules by the process of the invention outlined above.

With regard to the preferred 1,2-diols and the amounts thereof, reference is made to the above remarks, which are also applicable here, and so there is no need for repetition.

EXAMPLES

Example 1

A 1 L three-neck flask with high-speed stirrer, thermometer and dropping funnel was initially charged with
24 g of stabilizer (Lupasol® PA140, 20% strength by weight in water, BASF),
27 g of methoxy-methylolated melamine-formaldehyde precondensate (Luracoll® SD, 70% strength by weight in water, BASF),
4 g of a 1:1 mixture of hexane-1,2-diol and octane-1,2-diol (SymDiol® 68, Symrise) and 160 g of demineralized water.

The solution was gradually heated to 35'C and stirred at a speed of 850 rpm. Subsequently, via the dropping funnel, 180 g of a water-insoluble perfume oil (TomCap) were added in portions until an O/W emulsion had formed. In order to trigger the polycondensation of the melamine-formaldehyde precondensate and the deposition of the polymer on the perfume oil droplets in the emulsion, 8 g of 10% strength by weight formic acid were added to the solution, and a pH of 3.5 was established. Stirring of the solution continued at the temperature set for about 30 minutes.

In the course of the polycondensation, the microcapsules that were still provided with an elastic shell separated out and were dispersed in the aqueous phase by constant stirring. In order to harden the capsules, the constituents of the capsule shell were crosslinked. This was effected by gradually raising the reaction temperature from 35° C. to 60° C. within a period of about 30 minutes, while raising the stirrer speed to 1000 rpm. Toward the end, 33 g of a melamine dispersion were added, which led to further solidification of the shell. The dispersion was then stirred for a further 4 hours. Subsequently, 35 g of a 40% strength by weight aqueous urea solution were added in order to scavenge eliminated formaldehyde, and stirring was continued at a lower speed for a further hour.

The resulting capsule dispersion was adjusted to a pH of about 8 with NaOH and stabilized by addition of a cationic polymeric thickener, such that the particles did not settle out. The oil content of the capsules was 35.8% by weight.

Figure 4:
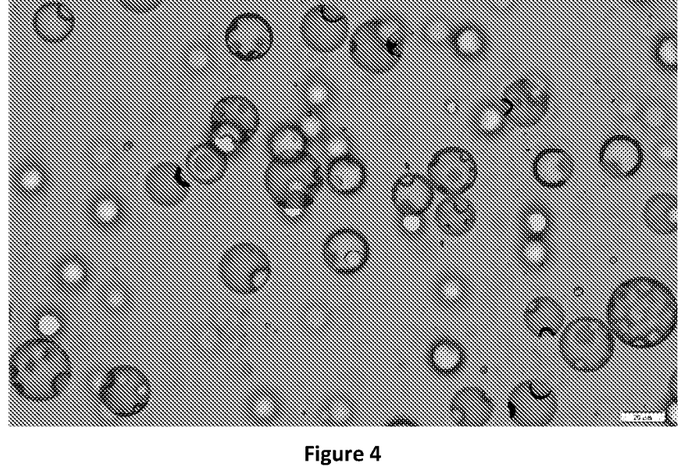
FIG. 4 is a photomicrograph illustrating a microcapsule dispersion prepared according to the present invention.
Figure 5:
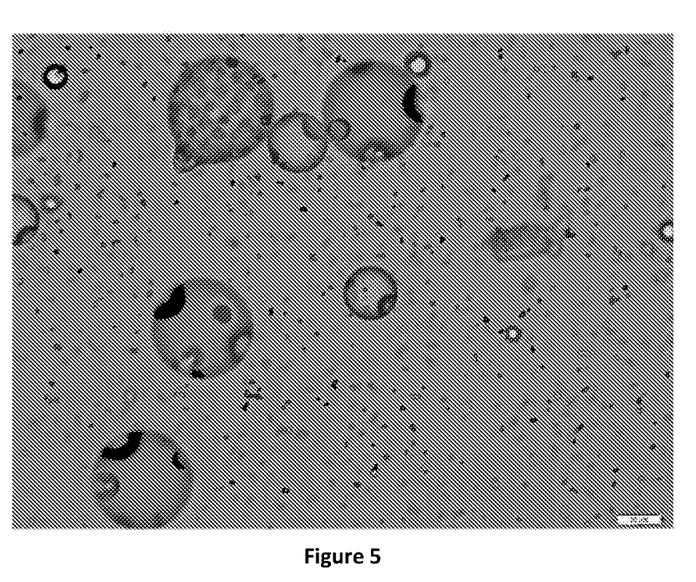
FIG. 5 is a photomicrograph illustrating a microcapsule dispersion prepared without the addition of 1,2-dials.

FIG. 4 shows a microscale photograph of the aqueous microcapsule dispersion, and FIG. 5 the same dispersion, except that it was obtained without addition of the 1,2-diols. It can be seen that the dispersion of the invention contains significantly smaller particles and less polymer grit.

Example 2

The specimen from example 1 was subjected to a sterility test according to European Pharmacopoeia 2011; 5.1.3 (=DAB VIII.14). After inoculation, the determination of the microbe count was conducted at intervals of 2, 7, 14 and 28 days. The results are compiled in table 1:

TABLE 1

| | Colony-forming units/g of product after inoculation with: | | | | |
|---|---|---|---|---|---|
| Incubation time (d) | *Staphyllococcus aureus* | *Pseudomonas aeruginosa* | *Escherichia coli* | *Candida albicans* | *Aspergillus brasilensis* |
| 0 | 3.4E+05 | 5.3E+05 | 4.2E+05 | 4.3E+05 | 4.3E+05 |
| 2 | <10 | <10 | <10 | <10 | <10 |
| 7 | <10 | <10 | <10 | <10 | <10 |
| 14 | <10 | <10 | <10 | <10 | <10 |
| 28 | <10 | <10 | <10 | <10 | <10 |

The reduction in all test microbes met the A criteria (recommended efficacy) of the requirements in the European Pharmacopoeia for formulations for cutaneous use.

The invention claimed is:

1. A process for producing microcapsules and controlling their particle size, comprising the following steps:
   (a) providing a first, aqueous formulation comprising at least one prepolymer;
   (b) providing a second, nonaqueous formulation comprising an active to be encapsulated;
   (c) mixing the aqueous phase and the nonaqueous phase in the presence of at least one emulsifier and/or stabilizer to form an emulsion;
   (d) polymerizing the at least one prepolymer present in the emulsion from step (c) to obtain a dispersion of microcapsules enclosing the active;
   (e) hardening and crosslinking the microcapsules obtained in step (d), and optionally
   (f) removing and drying the microcapsules from the dispersion,
   wherein
   (i) the emulsion is formed in step (c) in the presence of at least one 1,2-diol and
   (ii) the particles from the process have a single average particle size distribution of from 10 to 35 microns.

2. The process as claimed in claim 1, wherein the prepolymer is selected from the group consisting of optionally alkylated mono- and polymethylolurea or mono- and polymethylolmelamine precondensates, partially methylated mono- and polymethylol-1,3,5-triamino-2,4,6-triazine precondensates, mono- and polyalkylolbenzoguanamine and mono- and polyalkylolglycoluril precondensates, poly[N-(2,2-dimethoxy-1-hydroxy)]polyamines, dialdehydes and resorcinol and mixtures thereof.

3. The process as claimed in claim 1, wherein the active to be encapsulated is at least one aroma, at least one fragrance or at least one biogenic principle.

4. The process as claimed in claim 1, wherein the emulsifier is a 1,2-diol selected from the group consisting of pentane-1,2-diol, hexane-1,2-diol, octane-1,2-diol, decane-1,2-diol, dodecane-1,2-diol and mixtures thereof.

5. The process as claimed in claim 4, wherein the 1,2-diol is a mixture of hexane-1,2-diol and octane-1,2-diol.

6. The process as claimed in claim 1, wherein the diol is used in amounts of about 0.1% to about 10% by weight based on the emulsion.

7. The process as claimed in claim 1, wherein the stabilizer is selected from the group consisting of sulfonated acrylic copolymers, copolymers of acrylamides and acrylic acid, copolymers of alkyl acrylates and N-vinylpyrrolidone, sodium polycarboxylates, sodium polystyrenesulfonates, vinyl ether- and methyl vinyl ether-maleic anhydride copolymers, and ethylene-, isobutylene- or styrene-maleic anhydride copolymers and mixtures thereof.

8. The process as claimed in claim 1, wherein the emulsifier and stabilizer are each used in a total amount of about 1% to about 10% by weight based on the emulsion.

9. The process as claimed in claim 2 wherein polycondensation of an amine-formaldehyde precondensate is triggered by adjusting the pH of the emulsion to about 1.0 to about 5.8.

10. The process as claimed in claim 1, wherein the microcapsules are hardened or crosslinked by adjusting the temperature of the dispersion to about 50 to about 90° C.

11. The process as claimed in claim 1, wherein the microcapsules are hardened by adding melamine to the dispersion.

12. The process as claimed in claim 1, wherein the entire reaction is conducted with vigorous stirring.

13. The process as claimed in claim 1, wherein a formaldehyde scavenger is added to the dispersion after the capsules have been hardened.

* * * * *